United States Patent
Preston et al.

(10) Patent No.: US 8,023,498 B2
(45) Date of Patent: Sep. 20, 2011

(54) CONTROLLING ACCESS TO A DESTINATION IN A DATA PROCESSING NETWORK

(75) Inventors: Adrian James Preston, Hampshire (GB); David Ware, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 12/466,553

(22) Filed: May 15, 2009

(65) Prior Publication Data

US 2009/0290503 A1    Nov. 26, 2009

(30) Foreign Application Priority Data

May 20, 2008   (EP) .................................... 08156536

(51) Int. Cl.
*H04L 12/66* (2006.01)
(52) U.S. Cl. ...................................................... 370/352
(58) Field of Classification Search .................. 370/352; 709/226, 203, 217
See application file for complete search history.

(56) References Cited

U.S. PATENT DOCUMENTS

| | | | |
|---|---|---|---|
| 6,990,668 B1 | 1/2006 | Miller et al. | |
| 7,680,940 B2 * | 3/2010 | Morris | 709/226 |
| 7,693,050 B2 * | 4/2010 | Achlioptas et al. | 370/229 |
| 7,835,745 B2 * | 11/2010 | Rinne et al. | 455/442 |
| 2004/0205439 A1 | 10/2004 | Carmeli et al. | |
| 2004/0250283 A1 | 12/2004 | Duigenan et al. | |
| 2005/0267896 A1 * | 12/2005 | Goodman et al. | 707/10 |
| 2006/0087985 A1 | 4/2006 | Kakivaya et al. | |
| 2006/0271601 A1 * | 11/2006 | Fatula et al. | 707/201 |

* cited by examiner

*Primary Examiner* — Ricky Ngo
*Assistant Examiner* — Chandrahas Patel
(74) *Attorney, Agent, or Firm* — Thomas E. Lees, LLC

(57) ABSTRACT

A method and system of controlling access to a destination (17, 23, 24) in a data processing network where the destination is limited to a fixed number of requesters responds to a new request (50) for access from a given requestor (20) by determining whether the fixed number would be exceeded. If the fixed number would not be exceeded (51), the new request is granted by connecting (52) the given requester to the destination. If the fixed number would be exceeded, the liveness of the or each current connection to a respective requester is tested (55). If the liveness test succeeds, the new request is rejected but if the liveness test fails, the new request is granted (52).

17 Claims, 3 Drawing Sheets

CONTROLLING ACCESS TO A DESTINATION IN A DATA PROCESSING NETWORK

FIELD OF THE INVENTION

The present invention relates to data processing networks and to controlling access to a destination wherein the destination is limited to a fixed number of requesters.

BACKGROUND

Data processing networks exist in many forms from relatively small local distributed computing networks of computers to large remotely connected heterogeneous networks such as the Internet, which is a loose worldwide confederation of servers and browser clients. Connection and communication between points of a network takes place on several levels or layers, each with its own rules or protocols, ranging from the hardware level, through basic data transmission and transport levels, to the application level. Different multi-layer models have evolved, the best known being the TCP/IP (Transmission Control Protocol/Internet Protocol) suite, which has five layers. Another well-known model is the OSI (Open Systems Interconnection) model, which has seven layers.

In networks conforming to TCP/IP, for example, when one party ceases to require a connection to another party, TCP/IP should explicitly transmit data to signal the end of a connection. This frees both parties after which reconnection or a new connection can be established. However, if an application ends suddenly, no "end of connection" information is transmitted and the process at the other end of the connection may not observe its peer has ended. Subsequent attempts to re-establish the connection by the failing application may be rejected by the process at the other end, which may believe it is still connected.

To mitigate the risk of connections remaining in this half ended state forever, TCP/IP provides a liveness checking mechanism which may, optionally, be enabled for all users of a particular TCP/IP implementation (usually this would be all processes run on a particular computer). This mechanism involves periodically asking the party at the other end of a TCP/IP connection if they are still there—and if they do not reply in a timely fashion, assuming the connection has ended. In the scenario described above, this is the mechanism by which the process would eventually notice that a connection had ended, and permit the application to re-establish its connection.

The drawback with the liveness checking used by TCP/IP is that it is performed relatively infrequently, so early attempts by one party to re-establish a connection can still be rejected. Liveness monitoring has previously been proposed for Publish/Subscribe systems. In particular, related U.S. Patent Application Publication Nos. 2004/205439A1 and 2004/0250283A1 both entitled "Liveness Monitoring in a Publish/Subscribe Messaging System" describe the use of liveness monitoring of subscribers to ensure publication only takes place when there are live subscribers. These applications are silent on the problem stated herein of minimizing the prevention of reconnection (specifically resumption of a subscription) after a failure.

Liveness testing has also been employed outside the messaging environment as, for example in U.S. Pat. No. 6,990,668 B1 entitled "Apparatus and Method for Passively Monitoring Liveness of Jobs in a Clustered Computing Environment" and in U.S. Patent Application Publication No. 2006/0087985 entitled "Discovering Liveness Information in a Federation Infrastructure." Neither of these examples addresses the problem of denial of reconnection after a failure.

SUMMARY

Accordingly, embodiments of the present invention provide a method of controlling access to a destination in a data processing network where the destination is limited to a fixed number of requestors, the method comprising: in response to a new request for access from a given requestor, determining whether the fixed number would be exceeded; if the fixed number would not be exceeded, granting the new request by connecting the given requestor to the destination; if the fixed number would be exceeded, testing the liveness of the or each current connection to a respective requestor and either rejecting the new request if the liveness test succeeds or granting the new request and connecting the given requestor if the liveness test fails.

According to a second aspect, an embodiment of the invention also provides an access control system for controlling access to a destination in a data processing network where the destination is limited to a fixed number of requesters, the system comprising: control means responsive to a new request for access from a given requester to determine whether the fixed number would be exceeded and, if the fixed number would not be exceeded, granting the new request by connecting the given requestor to the destination; and liveness testing means for testing the liveness of the connection to a requestor; the control means being responsive to a determination that the fixed number would be exceeded to cause the testing means to test the liveness of the or each current connection to a respective requester and either to reject the new request if the liveness test succeeds or to grant the new request and to connect the given requestor if the liveness test fails.

In this way, in contrast with the prior art, the cost of performing a liveness check is only incurred when it is absolutely required, thereby minimising impact on bandwidth.

A preferred implementation of the method of an embodiment of the invention is where the network is a publish/subscribe messaging system and said requesters are subscribers to messages on topics published to a message broker. In this case access control is effected by said message broker to limit connection of subscribers.

This is particularly useful wherein the destination is a repository for messages matching a durable subscription previously registered in respect of a subscriber. Such messages persist even when the subscriber is disconnected. Further, only one subscriber is permitted to be associated with one durable subscription at any one time. Accordingly, in response to failure of the liveness test, the previous registration to the durable subscription is deleted enabling a new subscriber connection to resume the durable subscription.

The new subscriber connection can be a reconnection of the original subscriber, or the new subscriber can be a cloned further instance of the original subscription.

Thus, by immediately checking liveness, the message broker always permits a durable subscription to be re-established after a connection failure rather than leaving a window where it may be rejected.

Preferably, the liveness testing step comprises the message broker sending a request for acknowledgment to the subscriber and, in the event of a transmission failure or a failure to receive the acknowledgment within a predefined time, determining that the liveness test has failed and in the event that the acknowledgment is received, determining that the liveness test has succeeded.

In the event of failure of the liveness test, it is a preferred feature of an embodiment of the invention that the message broker actively disconnects the subscriber and rolls back any work in progress for that subscriber.

An embodiment of the invention is also applicable to cases which are more general than that of a durable subscription in a publish/subscribe system. It applies to cardinality restrictions where the fixed number of requesters is greater than one, the liveness testing step, in this case, including testing the connection to each requester in succession and, upon the first failure of the liveness test on any connection, granting the request and connecting the given requester to the destination.

Such a case may occur in a general message queuing system where the network is a point-to-point messaging system and the destination is a queue, the requesters being "Send" (also known as "Put") operations for putting messages on the destination queue.

According to a further aspect, an embodiment of the invention also provides a message broker in a publish/subscribe messaging system compatible with durable subscriptions, the broker comprising: a store for storing publications on topics subject to a durable subscription in the event that the durable subscription is inactive; connection control means responsive to a request from a client application for a durable subscription topic to determine if any other durable subscription for that topic appears to exist, the connection control means including liveness testing means for testing the liveness of any such other durable subscription and being arranged to terminate a connection to the other durable subscription if it is not live and to grant access to the requestor to the publications store and to subsequent publications on the durable subscription topic.

Thus, by building a liveness check into the messaging protocol used by an application when it connects to the message broker (often this is a proprietary protocol built on-top of TCP/IP), this liveness check can be used in the message broker logic to determine if a durable subscription is active, or to perform a cardinality check on the number of users of a destination.

Although the invention is applicable to the field of messaging systems, it should be realised that it may be employed in any network system where restrictions on numbers of connections to a destination occur and which uses liveness testing to resolve abnormal failures of connections.

BRIEF DESCRIPTION OF THE DRAWINGS

The present invention will now be described, by way of example only, with reference to a preferred embodiment thereof as illustrated in the accompanying drawings in which.

DETAILED DESCRIPTION

Figure 1:
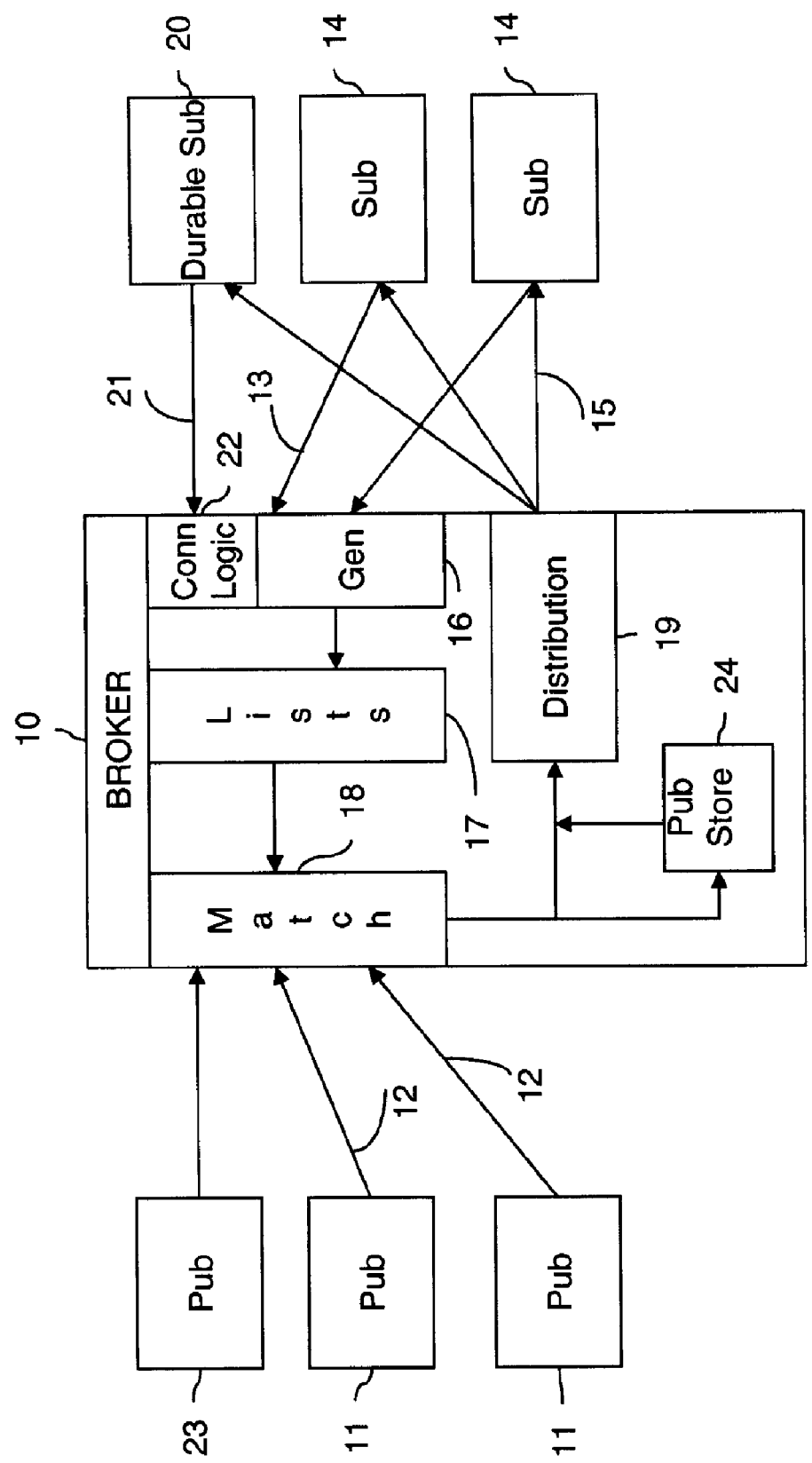
FIG. 1 is a block diagram of a Publish/Subscribe system implementing a method according to an embodiment of the invention.

In FIG. 1 there is shown a block diagram of a Publish/Subscribe system including a message broker computing device 10 in which an embodiment of the present invention is implemented. A number of publishers 11, which are data sources, such as computer-based commercial databases, supply items of information, normally referred to as "publications" to the broker 10. A publication includes not only the information content but also the name of the publication topic in a syntax recognizable by the broker. Publishers effectively supply publications at random times to the broker over logical connections 12.

Also logically connected to the broker 10 are a number of subscribers 14, which are client applications residing on input client devices such as terminals or Internet connected personal computers through which human operators submit, via the client devices, requests to be supplied with publications on selected topics by the broker. Subscribers employ the same syntax as the publishers to define topics of interest with the difference that they can also include wildcards in their subscription requests. Use of these wildcards enables the subscribers to request information on a set of topics and not just on a discrete topic.

Subscribers 14 supply the topic or topic set names in which they are interested to the broker 10 on logical connections 13, and list generation software 16 in the broker assembles the requests from each subscriber into subscription lists 17 which are stored in the broker. Match software 18 compares each new publish message from publishers 11 with the stored subscription lists 17 for each subscriber and, if they match, causes distribution software 19 to distribute the matched publication over logical connections 15 to those subscribers which have requested the topic of the publication. For a publication to match a subscribe request in a subscription list, it must be identical to a discrete subscribed topic or included in a set of topics defined in the subscription list, as for example by the use of wildcards.

FIG. 1 shows a simplified system, for ease of explanation, assuming a single broker in point-to-point communication with subscribers but more generally embodiments of the invention is applicable to a collection of brokers in a network. In such networks, publications may be distributed by multicasting to an intermediate node, for example, rather than by simple broadcasting directly to subscribers. Also, in multi-broker systems, proxy subscription forwarding is generally employed in which a broker forwards subscriptions to other brokers in the network and is itself listed by them as a subscriber.

FIG. 1 also includes a durable subscriber 20, which is a Java messaging service (JMS) client and subscribes to a predefined and pre-registered durable subscription. A durable subscriber, such as subscriber 20, is one which needs to receive messages which have been published on the subscription topic while the subscriber was inactive. If there is no active subscriber for a durable subscription, the JMS compliant broker 10 retains the subscription's messages until they are received by the subscriber, until they expire, or until the durable subscription is deleted. This enables subscriber applications, such as subscriber 20, to operate disconnected from the broker for periods of time and then reconnect to the broker and process messages that were published during their absence.

The durable subscriber 20 connects to the broker on a logical connection 21, through connection logic 22, which is effectively part of the subscription list generating software 16. In FIG. 1, one publisher 23, which in general is no different from publishers 11, is assumed to publish messages on the durable subscription topic. In connection with FIG. 2 below, the connection logic 22 determines whether a subscription request from subscriber 20 for the topic defined in the durable subscription can be listed in subscription list 17 and thus whether subscriber 20 can effectively be connected or reconnected to receive publications on the durable topic.

This determination depends solely on whether there is or there appears to be an existing connection for the durable subscription, since only one subscriber at a time may connect to the durable subscription topic. If there is no other connection, the subscriber 20 is listed and match logic 18 matches incoming publications on the durable subscription topic from publisher 23 and passes the publications to distribution logic 19 for transmission to subscriber 20.

If there is a conflict, subscriber 20 is not allowed to access the topic of the durable subscription. However, any publications matching the topic are stored in the broker in store 24 although they are not published to the subscriber.

Figure 2:
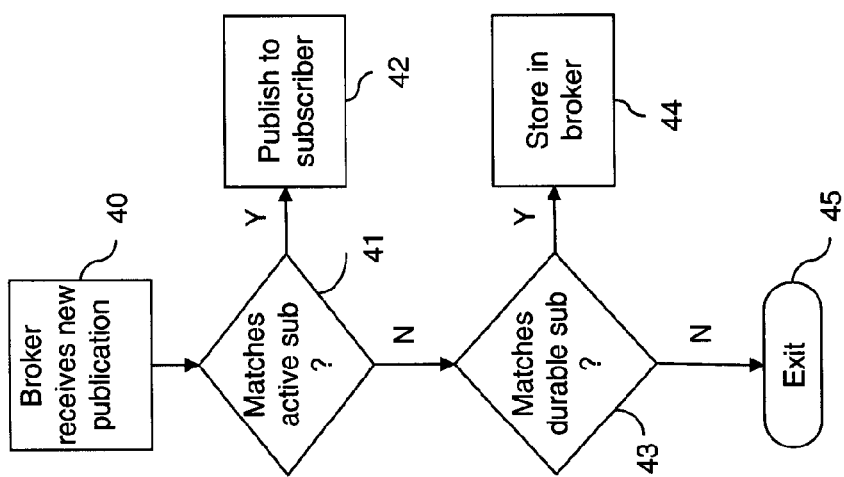
FIG. 2 is a flow diagram illustrating the use of durable subscriptions in the system of FIG. 1.

This behavior is conventional in JMS enabled messaging systems and is illustrated further in the flow diagram of FIG. 2. In step 40, a new publication is received by the broker 10. In step 41, the matching software 18 attempts to match the publication topic with active subscriptions listed in list 17. If an active subscription exists, the publication is forwarded to the listed subscribers in step 42.

If however, there is no matching subscriber, the matching software determines in step 43 whether there is nevertheless a durable subscription for the topic. If there is, in step 44, the publication is stored by the broker in publications store 24. If there is no active or durable subscription, the routine exits without action at step 45.

Figure 3:
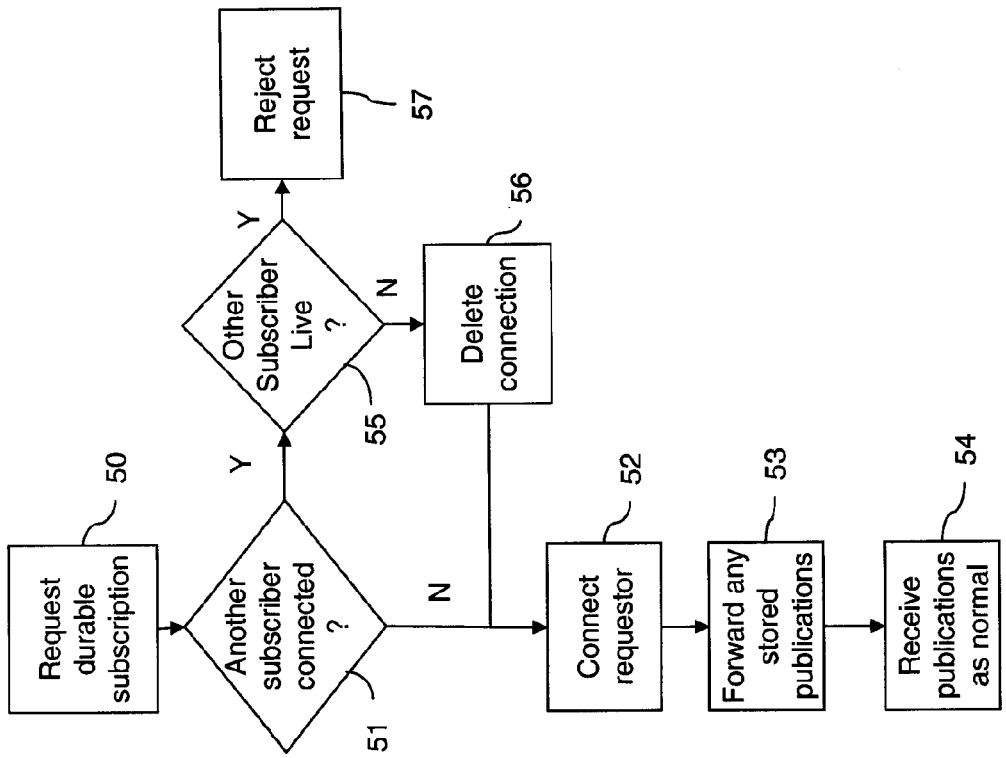
FIG. 3 is a flow diagram illustrating a method of an embodiment of the invention for controlling access requests for durable subscriptions in the system of FIG. 1

In FIG. 3, the possibilities arising when subscriber 20 requests or attempts to resume the durable subscription are illustrated. The durable subscription request is shown as step 50. In step 51, a test is made as to whether another subscriber is already connected. If not, the subscription may be resumed and subscriber 20 is reconnected by distribution logic 19 in step 52. If the request was a resubscription, publications on the topic which were stored in store 24 while the durable subscription was inactive are forwarded in step 53. After that, subscriber 20 receives any subsequent publications as normal in step 54.

However, if subscriber 20 had terminated its connection abnormally so that its disconnection was not recognized by broker 10, it would appear to connection logic 22, as a result of step 51, that a subscriber was already connected to receive the durable subscription. According to a preferred embodiment of the invention in this event, the connection logic 22 immediately initiates a liveness test in step 55 to check the apparent current connection. If this indicates the apparent subscriber connection is not in fact live, the corresponding record of the connection in logic 22 is deleted in step 56. The requesting subscriber 20 is then reconnected to resume its subscription as in steps 52, 53 and 54. If the liveness test shows that the current connection is alive, then the request to resume by subscriber 20 is rejected in step 57. This scenario may arise in systems where the durable subscriber is cloned for workload balancing and scaling purposes. In this situation, one of the cloned subscribers (instances) may have failed or had a connection problem, causing another instance immediately to try to reconnect.

If the current connection is not live, then, in addition to deleting the record in logic 22, the system may also roll back any work to date within the scope of a current transaction.

Figure 4:
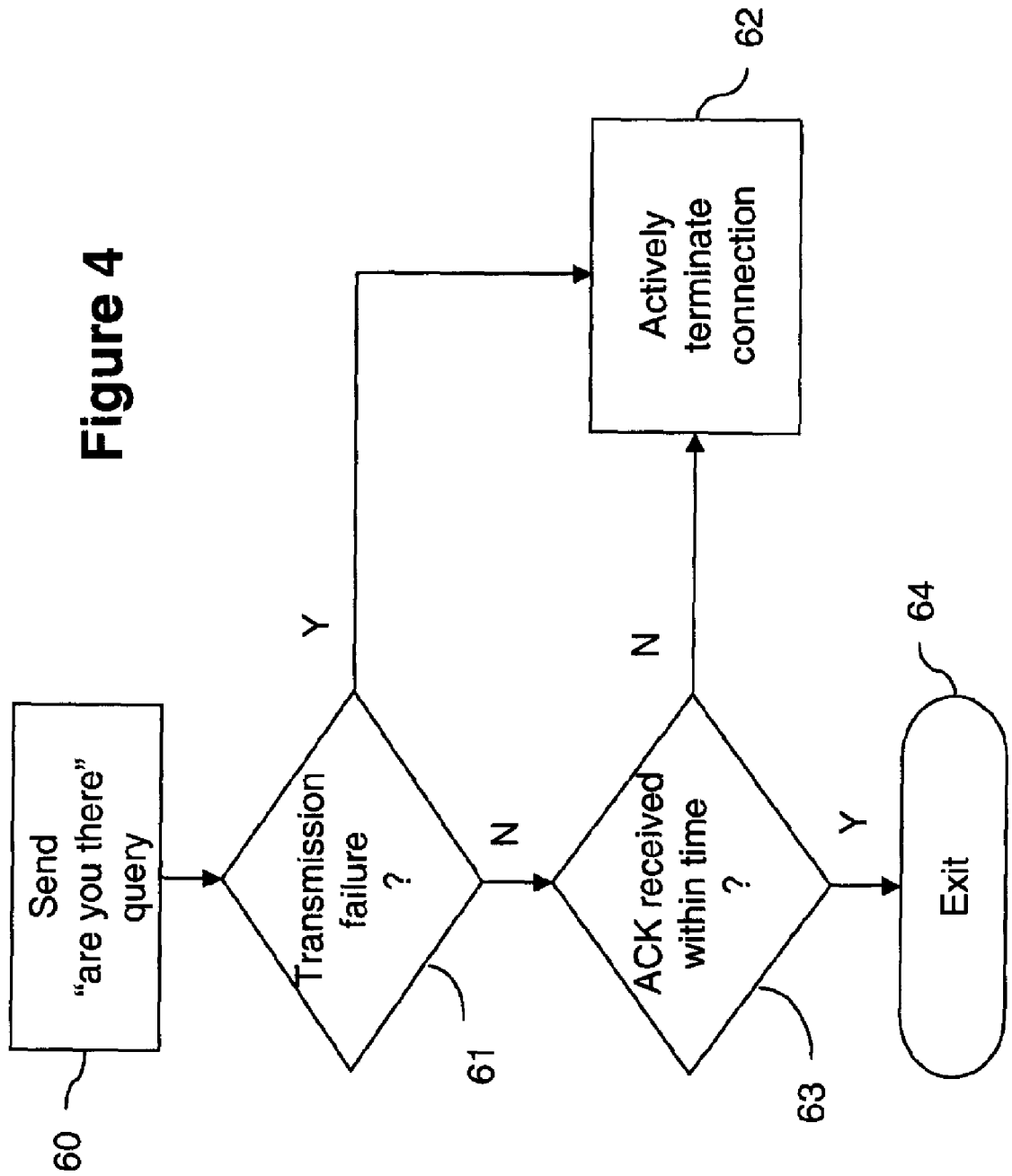
FIG. 4 is a flow diagram of the steps of a liveness test employed in the system of FIG. 1.

With reference to FIG. 4, the liveness check works as follows:

1) The message broker, in step 60, transmits data with the semantic of "are you there?" to the apparently connected subscriber (client). If the attempt to transmit the data fails, it assumes (step 61) that the client has disconnected, actively disconnects the client, in step 62 and cleans up any resources that the client is using (e.g. roll back transactions etc). Otherwise the messaging provider waits for a predefined period of time for a response.

2) The client should immediately acknowledge the receipt of "are you there?" by transmitting an acknowledgement.

3a) if the message broker does not receive a response inside its predefined wait period, it assumes (step 63) that the client has disconnected. The message broker will then actively disconnect the client (step 62) to ensure it really is disconnected and clean up any resources that the client is using (e.g. roll back transactions etc.).

3b) if the message broker receives a response then it assumes that the subscriber is still active and takes no action, exiting at step 64.

It will be realized that the method described in connection with FIGS. 1 to 4 can be modified to handle different cardinality conditions, that is, a different permitted number of connections.

It will also be realized that the method is not restricted to the durable subscription example described in detail but may be employed in other contexts. Within messaging systems, one of these other contexts may be the "Receive Exclusive" restriction in point-to-point messaging as to the number of sources allowed to put data on a particular message queue.

Other networked applications, for example, in the field of distributed computing can also benefit from the invention. For example, some operating systems have a "single-user mode" at which point they enforce a policy whereby only a single user can login to perform administrative actions. Also, some database systems have an "administration mode," which again limits the set of users that can connect to the database.

The invention claimed is:

1. A computer-implemented method of controlling access to a device in a data processing network where the device is limited to a fixed number of available connections, the method comprising:
   receiving a first request from a client to connect to the device on the data processing network, wherein the network is a messaging system and the client is a subscriber to a message on topics published to a message broker;
   determining whether the fixed number of available connections on the device would be exceeded by connecting the client;
   testing liveness of each connection on the device;
   dropping one of the current connections based on the liveness test;
   connecting the client to the device; and
   storing the message in a repository, wherein the message matches a durable subscription previously registered in respect of the subscriber, the message persist even when the subscriber is disconnected, and wherein said fixed number of available connections are configured so that only one subscriber is permitted to be associated with one durable subscription at any one time, whereby, in response to failure of the liveness test, the previous registration to the durable subscription is deleted enabling a new subscriber connection to resume the durable subscription.

2. The method of claim 1 wherein the fixed number of available connections is greater than one, the liveness testing including testing the connection to each client in succession and, upon the first failure of the liveness test on any connection, granting the first request and connecting the given client to the destination.

3. The method of claim 1, wherein the messaging system is a point-to-point messaging system, a destination in the network is a queue, and the first request including comprises operations for putting messages on the destination queue.

4. The method of claim 1 wherein the new subscriber connection is a reconnection of the original subscriber.

5. The method of claim 1 wherein the liveness testing comprises:
sending a request for acknowledgment to the subscriber and, in the event of a failure to receive the acknowledgment, determining that the liveness test has failed.

6. The method of claim 5 wherein, in the event of failure of the liveness test, the message broker actively disconnects the subscriber and rolls back any work in progress for that subscriber.

7. An apparatus for use in a data processing network, the apparatus comprising:
a processor coupled to a memory, wherein the processor is programmed implement a message broker having a fixed number of available connections for:
receiving a first request from a client to connect to the device on the data processing network, wherein the network is a messaging system and the client is a subscriber to a message on topics published to a message broker;
determining whether the fixed number of available connections on the device would be exceeded by connecting the client;
testing liveness of each connection on the device;
dropping one of the current connections based on the liveness test;
connecting the client to the device; and
storing the message in a repository, wherein the message matches a durable subscription previously registered in respect of the subscriber, the message persist even when the subscriber is disconnected, and wherein the fixed number of available connections are configured so that only one subscriber is permitted to be associated with one durable subscription at any one time, whereby, in response to failure of the liveness test, the previous registration to the durable subscription is deleted enabling a new subscriber connection to resume the durable subscription.

8. The apparatus of claim 7 wherein the liveness testing comprises:
sending a request for acknowledgment to the subscriber and, in the event of a failure to receive the acknowledgment, determining that the liveness test has failed.

9. The apparatus of claim 7 wherein, in the event of failure of the liveness test, the message broker actively disconnects the subscriber and rolls back any work in progress for that subscriber.

10. The apparatus of claim 7 wherein the fixed number of available connections is greater than one, the liveness testing including:
testing the connection to each client in succession and, upon the first failure of the liveness test on any connection, granting the first request and connecting the given client to the destination.

11. The apparatus of claim 7 wherein the messaging system is a point-to-point messaging system, a destination in the network is a queue, and the first request comprises operations for putting messages on the destination queue.

12. A non-transitory computer program product for controlling access to a device in a data processing network where the device is limited to a fixed number of available connections, the computer program product comprising at least one computer usable storage medium having computer usable program code embodied there, the computer usable program code operable for:
receiving a first request from a client to connect to the device on the data processing network, wherein the network is a messaging system and the client is a subscriber to one or more messages on topics published to a message broker;
determining whether the fixed number of available connections on the device would be exceeded by connecting the client;
testing liveness of each connection on the device;
dropping one of the current connections based on the liveness test;
connecting the client to the device; and
storing the one or more messages in a repository, wherein the one or more messages are associated with a durable subscription registered with the subscriber, the one or more message persist even when the subscriber is disconnected, and wherein said fixed number of available connections are configured so that only one subscriber is permitted to be associated with one durable subscription at any one time.

13. The computer program product of claim 12 wherein dropping one of the current connections further comprises:
deleting the durable subscription for the connection to be dropped and enabling the subscriber related to the client to resume the durable subscription.

14. The computer program product of claim 12 wherein dropping one of the current connections further comprises:
rolling back any work in program for the connection to be dropped.

15. The computer program product of claim 12, wherein testing liveness comprises:
sending a request for acknowledgment to the subscriber and, in the event of a failure to receive the acknowledgment, determining that the liveness test has failed.

16. The computer program product of claim 12, wherein the fixed number of available connections is greater than one and testing liveness includes:
testing the connection to each client in succession;
granting, upon the first failure of the liveness test on any connection, the first request; and
connecting the given client to the destination.

17. The computer program product of claim 12, wherein:
the messaging system is a point-to-point messaging system;
a destination in the network is a queue; and
the first request comprises operations for putting messages on the destination queue.

* * * * *